United States Patent [19]

Boville

[11] Patent Number: 5,228,706
[45] Date of Patent: Jul. 20, 1993

[54] HANDLE-PROPELLED CONTAINER HAVING EXTENDING AND RETRACTING WHEELS

[76] Inventor: Daniel R. Boville, 115 E. Freistadt Rd., Thiensville, Wis. 53092

[21] Appl. No.: 915,646

[22] Filed: Jul. 21, 1992

[51] Int. Cl.⁵ ............................. B62B 1/12; B62B 1/16
[52] U.S. Cl. ................................. 280/43.22; 280/30; 280/645; 280/655; 280/43.1
[58] Field of Search ................... 280/43.1, 43.14, 43.17, 280/43.18, 43.22, 643, 645, 652, 655, 655.1, 47.22, 47.26, 47.18, 30, 37, 79.2; 206/335

[56] References Cited

U.S. PATENT DOCUMENTS

| | | | |
|---|---|---|---|
| 79,571 | 7/1868 | Hewitt et al. | 280/43.22 X |
| 184,342 | 11/1876 | Cogger . | |
| 280,273 | 6/1883 | Wilson | 280/43.22 X |
| 824,733 | 7/1906 | Merrick et al. . | |
| 832,628 | 10/1906 | Schreffler | 280/652 |
| 1,161,007 | 11/1915 | Overmyer | 280/43.22 X |
| 1,626,819 | 5/1927 | Hazlett | 280/43.22 X |
| 2,672,349 | 3/1954 | Brock | 280/43.22 |
| 2,878,029 | 3/1959 | Dahmen et al. . | |
| 3,443,286 | 5/1969 | Groce | 280/43.14 X |
| 3,687,475 | 8/1972 | Wiczer | 280/43.17 |
| 4,254,850 | 3/1981 | Knowles | 280/645 X |
| 4,311,222 | 1/1982 | Castanier | 190/18 A |
| 4,417,738 | 11/1983 | Kendall | 280/43.17 |
| 4,460,188 | 7/1984 | Maloof | 280/645 X |
| 4,541,644 | 9/1985 | Diener | 280/43.1 |
| 4,542,918 | 9/1985 | Singleton | 280/650 |
| 4,575,109 | 3/1986 | Cowdery | 280/37 |
| 4,822,071 | 4/1989 | Widegren | 280/47.26 X |
| 4,846,493 | 7/1989 | Mason | 280/641 |
| 4,976,448 | 12/1990 | Wickersham et al. | 280/47.2 |

*Primary Examiner*—Brian Johnson
*Attorney, Agent, or Firm*—Jansson & Shupe, Ltd.

[57] ABSTRACT

In a container, e.g., a beach cooler, of the type having a pull handle and a pair of retractable wheels the improvement includes a pair of struts (one on either container side) and a pair of strut-positioned wheel assemblies, each mounted for pivoting movement. The U-shaped handle is linearly extensible and retractable and has two arms, each of which includes a cam-like surface. Each such surface bears against a strut for pivoting the wheels between extended and retracted positions, respectively, when the handle is extended or retracted.

12 Claims, 3 Drawing Sheets

HANDLE-PROPELLED CONTAINER HAVING EXTENDING AND RETRACTING WHEELS

BACKGROUND OF THE INVENTION

Most persons have experienced the struggle and frustration of attempting to move a heavy container from place to place. With containers used outdoors, the problem is aggravated when the terrain over which the container is transported is uneven and/or yielding like sand.

Earlier workers in the field of container "transport" have attempted to make this task easier by providing wheels. U.S. Pat. No. 4,311,222 (Castanier) shows a suitcase having tiny wheels (or "rollers" as the patent calls them) mounted thereto for more easily transporting the suitcase in railway cars, railway stations or on a carpet, all of which are generally flat, firm surfaces. The rollers are oriented so that the suitcase can be "walked" along edgewise or towed by a handle. While this patent is not particularly clear in all of its descriptive detail, it is apparent that the rollers are mounted in a fixed position for suitcase transporting. If one wishes to remove a roller, the suitcase must be opened and the roller retaining beads squeeze together to permit the roller to be withdrawn from its holder.

U.S. Pat. No. 4,846,493 (Mason) shows a container embodied as a portable cooler with wheels mounted for pivoting movement between extended and retracted positions. Wheel extension and retraction is purely manual. That is, when transporting the cooler using the wheels, a cross-rod is disengaged from an upper pair of hooks, pushed downward to extend the wheels and engaged with a lower set of hooks. When the user wishes to retract the wheels, the rod is disengaged from the lower hooks and re-engaged with the upper hooks. While the cooler has a front towing handle, wheel extension and retraction is unrelated to the handle or to handle movement.

These examples of earlier efforts in this field tend to have certain disadvantages. The suitcase rollers shown in the Castanier patent are extremely small and appear to be suitable for use only on a smooth surface. And such rollers are difficult to attach and remove. At least for removal, the suitcase must be opened.

While the wheel arrangement shown in the Mason patent is better adapted for uneven terrain and sand, it appears not to be especially handy to use. That is, to use the wheels, one must place the cooler on a surface, go to the cooler rear portion and unlatch and lower the wheels. Only then can the user take up the towing handle for cooler transport. When the cooler is to be carried in a vehicle for example, one must again place the cooler and manually retract the wheels using a procedure substantially the opposite of that described above.

A container having wheels automatically positioned by manipulation of the container handle would be an important advance in the art.

OBJECTS OF THE INVENTION

It is an object of the invention to provide a container with improved wheel positioning means overcoming some of the problems and shortcomings of the prior art.

Another object of the invention is to provide a container with improved wheel positioning means wherein wheels are automatically extended and retracted by manipulation of a container handle.

Yet another object of the invention is to provide a container with improved wheel positioning means wherein the container is suitable for use on uneven and/or yielding terrain.

Another object of the invention is to provide a container with improved wheel positioning means whereby wheels can be extended, the container pulled and the wheels retracted, all from a single position. How these and other objects of the invention are accomplished will become apparent from the following detailed description taken in conjunction with the drawing.

SUMMARY OF THE INVENTION

The invention is an improvement in a container, e.g., a beach cooler, of the type having a pull handle and a pair of retractable wheels. The improvement comprises a strut mounted for linear movement and a strut-positioned wheel assembly mounted for pivoting movement in concert with movement of the strut.

The generally U-shaped handle has a gripping portion and a pair of arms extending from such portion, one arm at either portion end. Each arm has a cam-like surface and is received in a guide slot for sliding arm movement and the handle is linearly extensible and retractable. Each arm includes a cam-like surface for pivoting a separate assembly between wheel-extended and wheel-retracted positions as the handle is extended and retracted, respectively.

More specifically, the wheel assembly includes a strut-actuated lever which pivots with strut movement. A wheel is rotatably mounted at the first end of the lever and the strut and lever are attached to one another at the lever second end. At a location between its ends, the lever is mounted to the container for pivoting movement. Preferably, the lever is a first class lever.

The strut includes an end portion, preferably curved, which contacts the cam-like surface of the handle during handle extension and retraction. The strut and lever are spring-biased in a wheel-extending direction and when the handle is extended or drawn outward away from the container for pulling the container along on its wheels, the handle surface moves out of an "interference" position. This permits the strut and lever to move and extend the wheels for easy container transport. When the handle is retracted by pushing it toward the container, the handle surface contacts and slides across the strut end portion. This "camming action" urges the strut and wheel assembly toward a wheel-retracting position against the force of the spring.

Both the strut and the handle are configured and mounted for linear movement and define an included angle between them. In one embodiment, such angle is about 90° but arrangements with other included angles can be used.

DETAILED DESCRIPTION OF PREFERRED EMBODIMENTS

Figure 1:
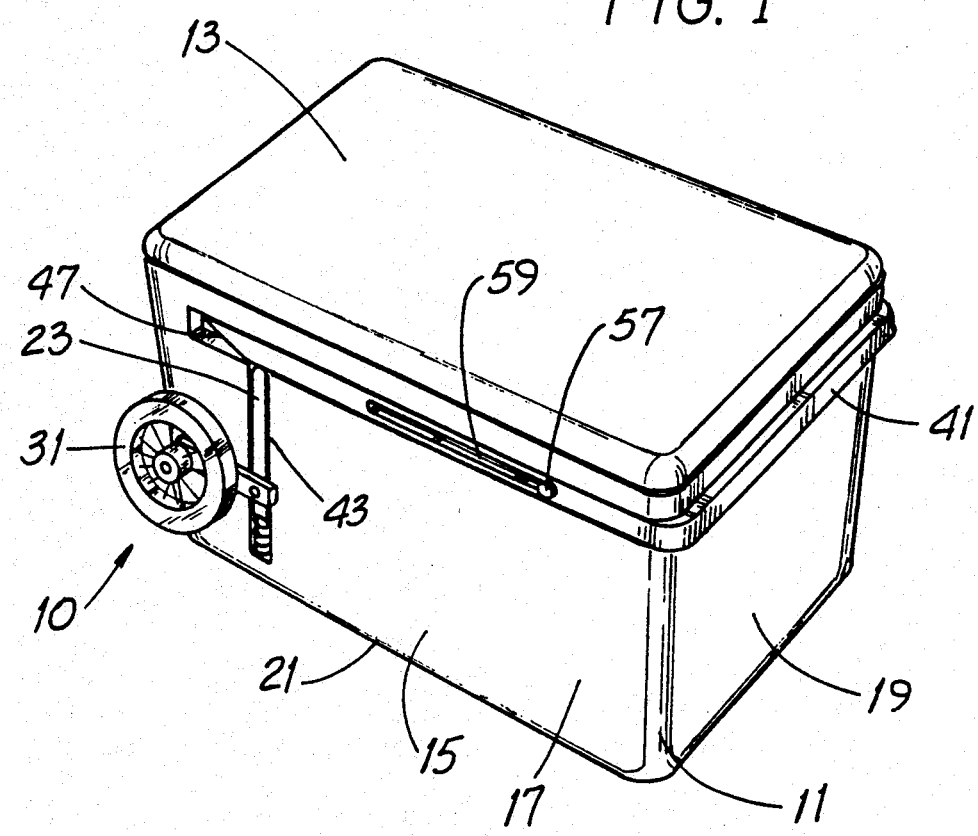
FIG. 1 is an isometric view of a container with improved wheel positioning means and showing the wheels in the retracted position and the handle in the stored position for manual container carrying.
Figure 2:
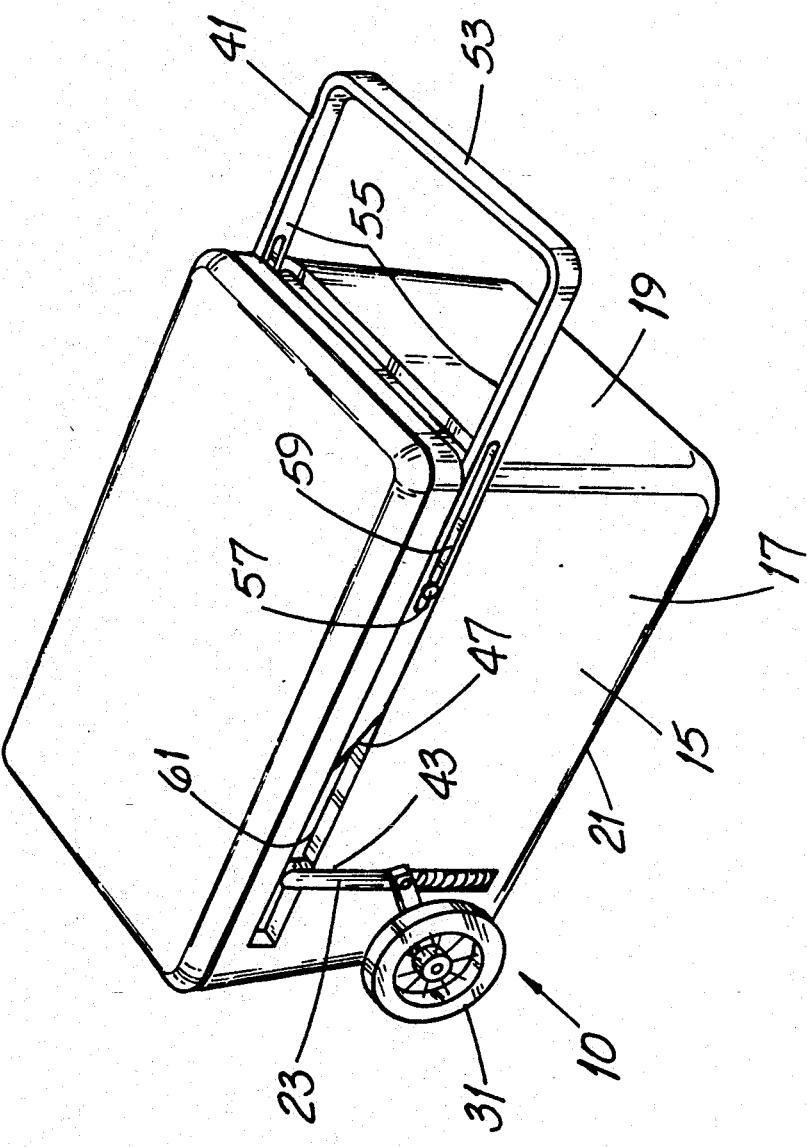
FIG. 2 is an isometric view of the container of FIG. 1 shown with the wheels extended and the handle in the transport position for wheeled container movement.

Referring to FIGS. 1 and 2, the improved wheel positioning means 10 is shown in connection with a container such as an exemplary picnic or beach cooler 11. The cooler 11 includes a lid-like cover 13 and a generally rectangular receptacle 15 which can be used to contain, protect and transport chilled beverages, food items and the like. The receptacle 15 is defined by a pair of side walls 17, front and rear end walls 19 and a bottom 21, all of which are joined together as shown. A cooler 11 equipped with the new wheel positioning means 10 is particularly useful at beaches where the terrain is uneven and footing is nearly always more difficult than upon a firm surface.

Figure 3:
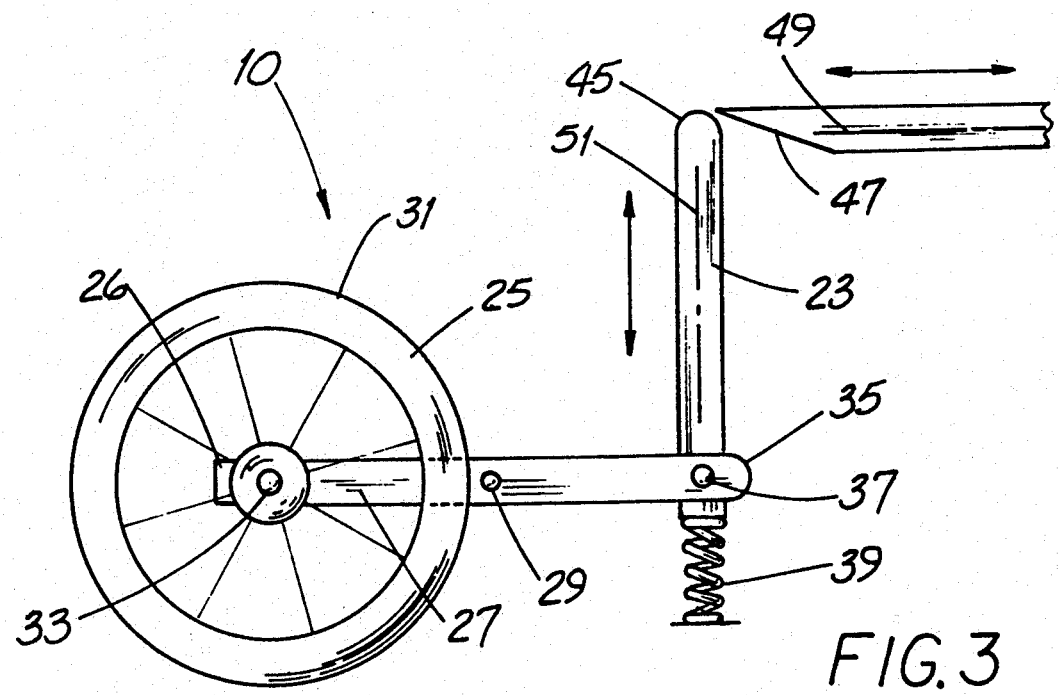
FIG. 3 is an enlarged side elevation view of the improved wheel positioning means shown in FIGS. 1 and 2. The positioning means is shown in a first class lever arrangement.

Referring to FIG. 3, a bar-like, vertically movable strut 23 and a strut-positioned wheel assembly 25 are mounted at the lower rear portion of each side wall 17. Such assembly 25 includes an elongate lever 27 mounted for pivoting movement near the lever center at a pivot point 29. The assembly 25 also has a wheel 31 mounted on an axle 33 at the rear terminus of the lever 27 for wheel rotation when the wheels 31 are extended downward That is, each wheel 31 is mounted independently and each wheel axle 33 is attached to its own elongate pivoting lever 27 for wheel extension or retraction.

Students of high school physics are familiar with three general classes of levers, namely, first, second and third. With a first class lever used in a highly preferred embodiment of the positioning means 10, the "weight" (the wheel 31 shown in the FIGURES) is at one end 26 of the lever, the motive force is applied at the other end 35 of the lever 27 and the pivot fulcrum or pivot point 29 is between the ends 26,35.

In a second class lever, the fulcrum and motive force are at the lever ends and the weight is between the ends. In a third class lever, the fulcrum and weight are at the ends and the motive force applied between them.

Figure 4:
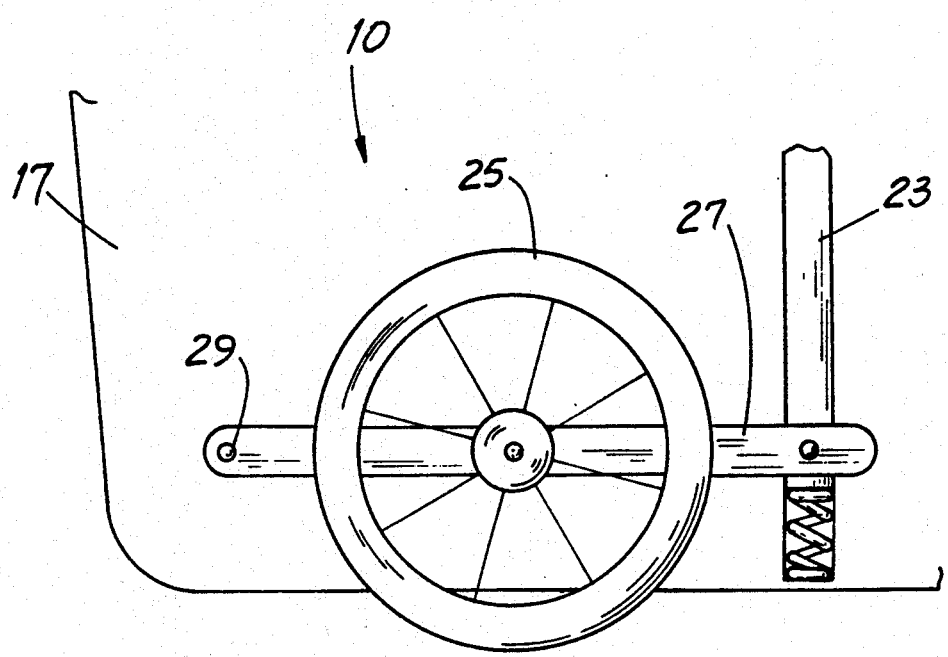
FIG. 4 shows the inventive wheel positioning means in a second class lever arrangement.
Figure 5:
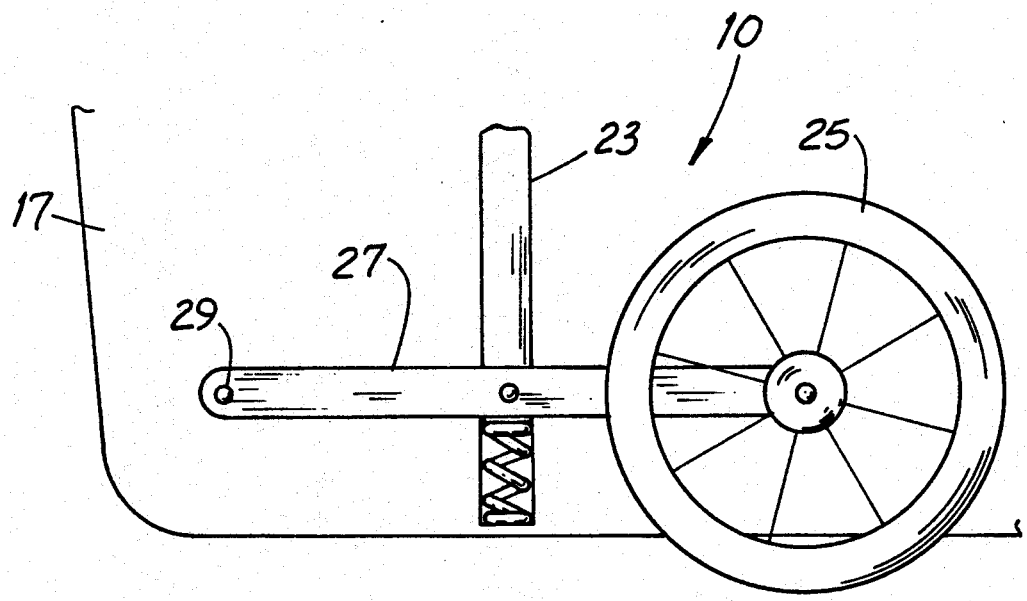
FIG. 5 shows the inventive wheel positioning means in a third class lever arrangement.

While a first class lever is illustrated (and the following description relates to a first class lever arrangement), there seems to be no reason why a second class lever or a third class lever could not be used if either were later found to be more advantageous. FIGURE 4 shows the strut 23 and assembly 25 in a second class lever arrangement while FIG. 5 shows a third class lever arrangement.

Referring again to FIG. 3, the "force-application" end 35 or forward end 35 of the lever 27 is connected to an elongate strut 23 at a lever-strut attachment point 37. The strut 23 is biased upward (in the "wheel extended" direction) by a compression spring 39 In the absence of a counter-force (as would result from the cam action of the handle 41 as described below), the spring 39 also indirectly biases the end 35 of the lever 27 upward. When the lever 27 and strut 23 are so biased, the wheel 31 is urged downward to contact the ground and support the bottom 21 of the cooler 11 somewhat above the ground surface.

In the preferred arrangement, it is important that the strut 23 be permitted to move only linearly and be prevented from tipping Accordingly, the strut 23 is received in a recessed guide groove 43 which permits up-and-down linear movement but which prevents the strut 23 from tipping sideways.

The top end 45 of each strut 23 is rounded and is contacted by an angled, cam-like surface 47 formed at an end of the bail-like U-shaped handle 41. The handle 41 moves along an axis 49 which is generally parallel to the ground and generally perpendicular to the axis of movement 51 of the strut 23. When the handle 41 is drawn linearly outward (to the right as shown in FIGS. 1-3) for transporting the cooler 11 cart-fashion, the handle 41 and handle surface 47 no longer interfere with upward movement of the strut 23. As a consequence, the spring 39 urges the strut 23 upward and the wheel 31 is urged downward to roll along the ground.

On the other hand, when the handle 41 is urged linearly rearward (leftward in the FIGURES) for handle storage, the surface 47 bears against the upper rounded end 45 of the strut 23 and urges the strut 23 downward. The lever 27 therefore pivots in a direction to retract the wheel 31, i.e., clockwise as illustrated in FIG. 3.

When the handle 41 is urged rearward, travel is limited by the gripping portion 53 coming into abutment with the front receptacle wall 19. And, of course, the length of the handle side arms 55 should be selected so that when the gripping portion 53 is in such position, the surface 47 has passed over the end 45 and depressed the strut 23.

When the handle 41 is drawn outward, handle movement is limited by a pin 57 attached to a side wall 17 and protruding into a guide slot 59 formed in the handle 41. Since the load on the handle 41 may be appreciable at times, each of the handle side arms 55 is received in a guide slot 61 which supports the handle 41 and prevents it from twisting upward or downward with respect to the receptacle 15.

Persons of ordinary skill in the mechanical arts will appreciate the manner of mounting the axle 33, fulcrum or pivot point 29 and force-application end 35 of the lever 27. In particular, such persons will recognize how to select the relative spacing between each and how to select the projected horizontal length of the surface 47 so that the operating forces on the handle 41 are reasonably low and so that handle movement results in enough up or down movement of the wheels 31 to fully extend or retract them.

While the principles of the invention have been described in connection with a few embodiments, it should be understood clearly that these descriptions are by way of example and are not intended to be limiting.

I claim:

1. In a container having a pull handle and a pair of retractable wheels, the improvement comprising:

a strut mounted on the container for sliding motion along an axis of movement;

a strut-positioned wheel assembly attached to the container for pivoting movement, the assembly including a lever actuated by the strut and mounted to the container at a pivot point;

and wherein:

the handle is slidably connected to the container and extensible and retractable with respect to the container and includes a cam-like surface contacting the strut for pivoting the assembly between wheel-extended and wheel-retracted positions;

the handle moves along an axis which is less than 180° angular with respect to the axis of movement of the strut; and, the strut applies to the wheel assembly at a point which, during wheel extension and retraction, is maintained at a substantially constant distance from the pivot point.

2. The container of claim 1 wherein the strut and the lever are attached to one another.

3. The container of claim 2 wherein the strut includes a portion contacting the cam-like surface during handle extension and retraction.

4. The container of claim 1 including a spring applying force to the strut and wherein the strut and lever are spring-biased in a wheel-extending direction.

5. The container of claim 4 wherein the strut and the handle define an included angle therebetween.

6. The container of claim 5 wherein the angle is about 90°.

7. The container of claim 1 wherein the handle includes a gripping portion and a pair of arms extending from such gripping portion and each arm is received in a separate guide slot formed in the container.

8. The container of claim 7 including a pair of cam-like surfaces, one on each arm.

9. The container of claim 1 wherein the lever is a first class lever.

10. The container of claim 3 wherein the lever is a first class lever.

11. In a container having a pull handle and a pair of retractable wheels, the improvement wherein:
a strut-positioned wheel assembly is attached to the container for pivoting movement;
the handle is linearly extensible and retractable with respect to the container and includes a cam-like surface for contacting a strut and pivoting the assembly between wheel-extended and wheel-retracted positions; and the container further includes:
a strut mounted on the container for linear movement and having a portion contacted by the cam-like surface during handle extension and retraction, the strut and the handle defining an included angle therebetween of about 90°.

12. The container of claim 11 including a spring applying force to the strut and wherein the strut and the lever are spring biased in a wheel-extending direction.

* * * * *